United States Patent [19]

Gray et al.

[11] Patent Number: 4,651,157

[45] Date of Patent: Mar. 17, 1987

[54] SECURITY MONITORING AND TRACKING SYSTEM

[75] Inventors: Donald R. Gray; Lawrence R. Green, III, both of Carmel, Ind.; Robert L. Gendler, Lighthouse Point; John A. Carrott, Pompano Beach, both of Fla.

[73] Assignee: Mets, Inc., Pompano Beach, Fla.

[21] Appl. No.: 731,280

[22] Filed: May 7, 1985

[51] Int. Cl.[4] .......................... G01S 3/02; B60R 25/00
[52] U.S. Cl. .................................... 342/457; 342/450; 342/389; 340/539; 340/63
[58] Field of Search ............... 343/457, 450, 451, 453, 343/389; 340/539, 63

[56] References Cited

U.S. PATENT DOCUMENTS

| | | | |
|---|---|---|---|
| 3,518,674 | 6/1970 | Moorehead et al. | 343/457 |
| 3,680,121 | 7/1972 | Anderson et al. | 343/457 |
| 3,757,290 | 9/1973 | Ross et al. | 343/457 |
| 3,789,409 | 1/1974 | Easton | 343/457 |
| 3,848,254 | 11/1974 | Drebinger et al. | 343/457 |
| 4,222,052 | 9/1980 | Dunn | 343/453 |
| 4,435,711 | 3/1984 | Ho et al. | 343/389 |
| 4,547,778 | 10/1985 | Hinkle et al. | 340/539 |

OTHER PUBLICATIONS

Carey and Welsh, "Location and Control of Vehicles" The SERT Journal V5, 7/71, No. 4, pp. 87-92.

Primary Examiner—Theodore M. Blum
Assistant Examiner—D. Cain
Attorney, Agent, or Firm—Hoffman, Wasson & Fallow

[57] ABSTRACT

A method and apparatus for positively indicating the position of a land-based vehicle, a marine vessel or an aircraft, utilizing a security system provided in the secured mode of transportation monitored by a central station. Navigational information transmitted by LORAN-C transmitters or satellite transmitters are received and then retransmitted to the central station which determines the exact latitude/longitude coordinates of the secured mode of transportation. The secured mode of transportation also includes a security panel for monitoring the condition of various parameters. An interface is connected to the security panel and the navigational receiver for coordinating the transmission of information relating to the conditions monitored by the security panel as well as the information received by the navigational receiver before they are sent to a radio for transmission to the central station.

29 Claims, 2 Drawing Figures

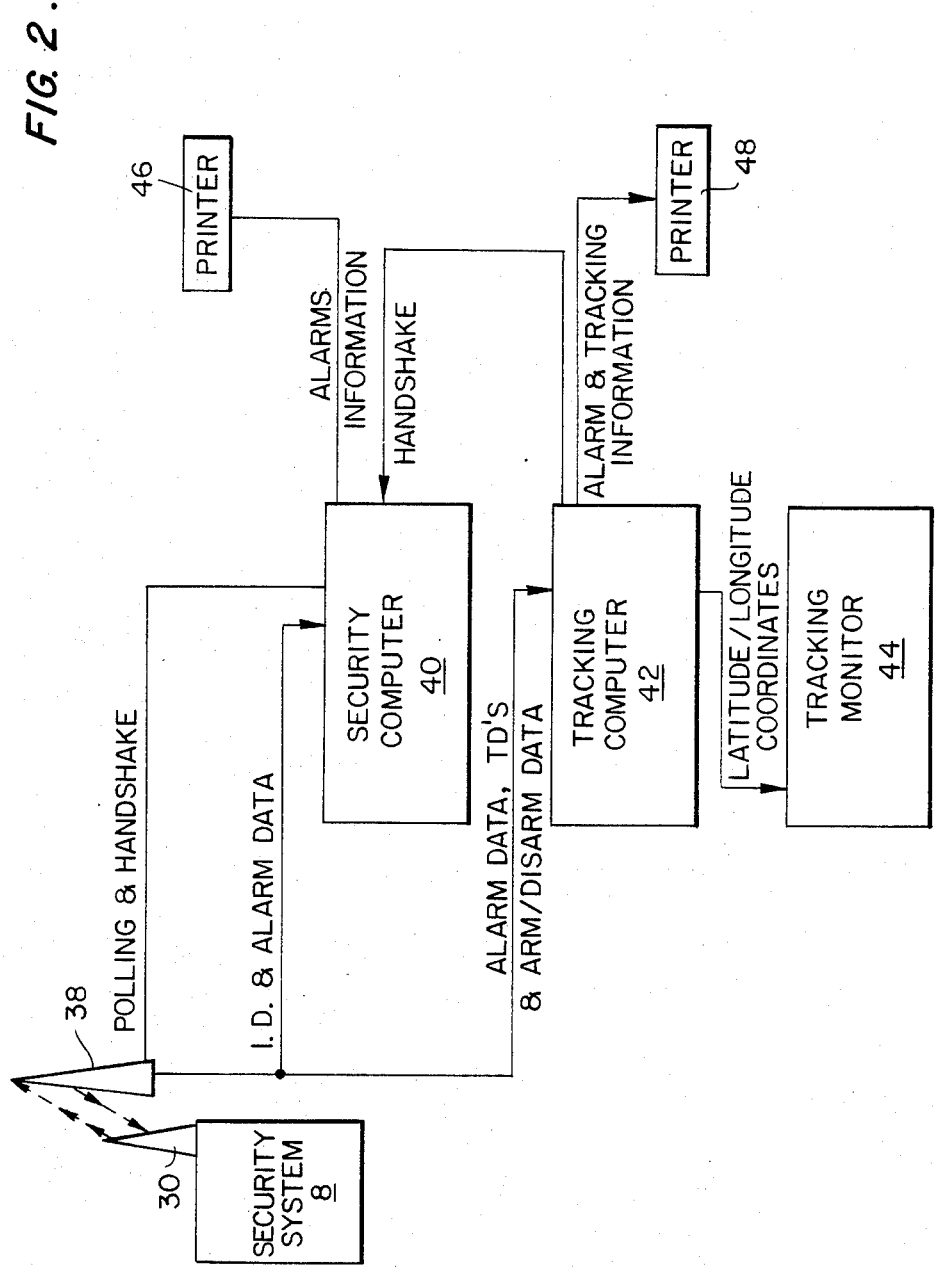

SECURITY MONITORING AND TRACKING SYSTEM

BACKGROUND OF THE INVENTION

Crime statistics provided by the Coast Guard and local police organizations have shown that in the last several years, the number of burglaries, vandalism and the theft of both land-based vehicles and marine vessels have increased dramatically. For example, Coast Guard statistics indicate that 75,000 vessels have been reported stolen in the last five years and insurance companies report that claims in excess of $200,000,000.00 have been reported each year. Furthermore, the Coast Guard has reported that in the year 1982 alone, nearly 50,000 calls for assistance were answered for pleasure craft and that over 150,000 people were assisted and nearly 5,700 lives saved.

Consequently, various systems have been developed which endeavor to monitor the current position and status of either a land-based vehicle, such as personal automobiles, fleets of cars, trucks, taxis or police cruisers, mobile homes or vans and pleasure crafts such as yachts. Additionally, other systems have been developed for monitoring a vehicle or vessel for the presence of a malfunction, a fire condition or an unauthorized intrusion.

Motorola Communications and Electronics, Inc. of Schaumburg, Ill. is currently developing a land-based tracking system for determining the current position of vehicles provided with an existing mobile communications system between a central dispatcher and each individual vehicle. This system, which could be employed by police departments, taxi companies and fleets of trucks, utilizes a LORAN-C chain employing a single master and only two secondary transmitters to determine the particular latitude/longitude coordinates of the vehicles. However, problems have developed in implementing this system since each of the receivers provided in the land-based vehicle determine the particular coordinates of that vehicle and then transmits these coordinates to the central dispatching station. Since the LORAN-C signal is a ground wave, the velocity of the wave is altered by a variety of natural or man-made sources of interference, as well as being adversely affected by the particular terrain over which it passes. Although the Motorola system is cognizant of these problems, they chose to correct any inaccuracies by compensating for the errors generated by these sources of interference in the unit installed in each vehicle, each unit geared to a particular regional area. Therefore, regardless of whether these compensation techniques adequately rectify the errors generated by the LORAN-C transmissions, these compensation factors would have absolutely no application or use if the particular vehicle was no longer in its assigned region. Additionally, this system is used merely to determine the position of the vehicle and cannot be applied to monitor more than one manually set condition of the vehicle, nor can it be utilized to adequately determine whether the vehicle has been stolen.

A second vehicle tracking system is presently being developed by II Morrow, Inc. of Salem, Oreg. This system is in many respects very similar to the Motorola system in that it can only be used for land-based vehicles, the determination of the exact coordinates of a particular vehicle is directly calculated by the unit provided in each vehicle and no provision is made for automatically monitoring the condition of the vehicle.

Therefore, no existing system is presently available which adequately and accurately monitors the position of either a land-based vehicle, airplane or a sea-going vessel, determines whether that vehicle or vessel is currently being stolen and continuously monitors various operating parameters of that particular vehicle, airplane or vessel.

SUMMARY OF THE INVENTION

The disadvantages of the prior art are overcome by the present invention which is directed to a method of positively determining the exact position of a land-based mobile unit, air vehicle or a sea-going vessel. It should be noted that this method, as well as the security monitoring system described hereinbelow, has equal applicability to any mode of transportation and, therefore, for purposes of clarity, we will limit our description to the utilization of this method and system with respect to a sea-going vessel.

The method of tracking the vessel utilizes a LORAN-C transmitting network to provide the raw data used with a known triangulation computation technique for positively indicating the position of the vessel. Generally speaking, a typical LORAN-C system includes a master transmitting station and at least four "slave" transmitters. The master station transmits a coded series of pulses used to synchronize the operation of the "slave" transmitters. After a predetermined coding delay, each "slave" transmitter will transmit a group of coded pulses. A LORAN-C receiver placed upon the vessel receives both the signals transmitted by the master as well as all of the signals transmitted by the "slave" transmitters. Since the exact latitude/longitude coordinates of each of these stations is known, the time-delays (TDs) between the transmissions by the "slave" transmitters and the receipt of these signals by the vessel is used, through the standard triangulation technique, to determine the exact latitude/longitude coordinates of the vessel. All of the prior art systems presently available complete all of the computations using the received TDs in the unit provided on the monitored vehicle or vessel.

Since the LORAN-C transmitters transmit a ground wave of relatively low frequency (between 90 and 110 KHz) the accuracy of this system is compromised because the signal is affected by the terrain over which it travels. The present invention overcomes the problems of the prior art by performing the triangulation computations at a central monitoring station. The onboard receiver receives the transmitted TDs and merely transmits the raw data to the central station. Each of the central stations communicates with the vessels through the use of one or a plurality of fixed, non-mobile antennas. Upon installation, the exact latitude/longitude coordinates of the fixed, non-mobile antennas are determined. Each antenna is provided with a LORAN-C receiver and receives the same navigational pulses generated by the LORAN-C transmitters received by the vessels. The navigational pulses received by the fixed antenna are used to determine the latitude/longitude coordinates of the antenna and are compared to the known coordinates of each antenna at computers provided at each central station. This difference information is used in conjunction with the TDs transmitted from each vessel to automatically determine the exact position of the vessel with great accuracy.

The present invention also provides a security monitoring apparatus provided on the sea-going vessel. This apparatus coordinates the outputs of various sensing devices provided on the vessel as well as responding to polling or scanning of the vessel by the central station. Although the various parameters monitored by the security system can be changed according to the demands and requirements of each user, the following parameters are listed merely to indicate the various usages to which the present invention could be applied.

First and foremost, the present invention can monitor and determine whether the vessel is presently being utilized without authorization. This "anchor-watch" feature employs the LORAN-C navigational technique described hereinabove. In this situation, the TDs transmitted by the LORAN-C transmitters are retained by the vessel. When the system is armed, it can determine if the vessel is moved outside of a particular radius, such as 1/10th of a mile. The interval between the transmissions of each of the master's transmissions is approximately one second and therefore, each time the time delays are received by the vessel, a computation is performed to determine the exact position of the vessel. This exact position is then compared to the position of the vessel when the anchor has been armed, and when the present position crosses the circumference of a circle having a radius of, in this situation, 1/10th of a mile, the central station is automatically alerted.

Additionally, the central station would be automatically alerted if the security monitoring apparatus senses the presence of an unauthorized intrusion upon the vessel, the presence of excessive heat in key areas indicating the presence of a fire, the mechanical breakdown of various devices on the vessel such as the engine, generator or low voltage battery condition, high bilge water level, the presence of excessive moisture in various key areas on the vessel, and the proper arming of the entire security system.

Furthermore, the present invention includes a system which allows the occupants of the vessel to manually alert the central station of various situations such as an emergency or May-Day condition, a medical emergency, the presence of a man-overboard or the fact that the occupants on the vessel are presently being ambushed or burglarized. As was true with the conditions which automatically alert the central station, this listing of manually alerted conditions is not deemed to be comprehensive of all of the conditions which can be monitored but have been included to illustrate the various conditions which can be controlled.

Communications between the vessel and the central station are accomplished by a two-way radio utilizing a full duplex radio frequency. This radio is capable of both receiving and transmitting signals simultaneously and would respond to the periodic polling generated by the central station as well as alarm signals manually or automatically generated by the onboard security system.

The information received by the central station is channeled into various computers or monitors. The computers monitor the security of the vessel and personnel provided at the central station would notify the proper authorities if a fault condition is sensed. A tracking computer is used to determine the exact position of the vessel and a tracking monitor is employed to visually display the position of the vessel. Various printers are also employed to generate a hard copy of the security status of the vessel as well as positioning information of the vessel.

BRIEF DESCRIPTION OF THE DRAWINGS

Other objects, features and advantages of the present invention will become more apparent from the following description when read in conjunction with the accompanying drawings, in which:

FIG. 2 is a block diagram of the central monitoring

DETAILED DESCRIPTION OF THE PRESENT INVENTION

Figure 1:
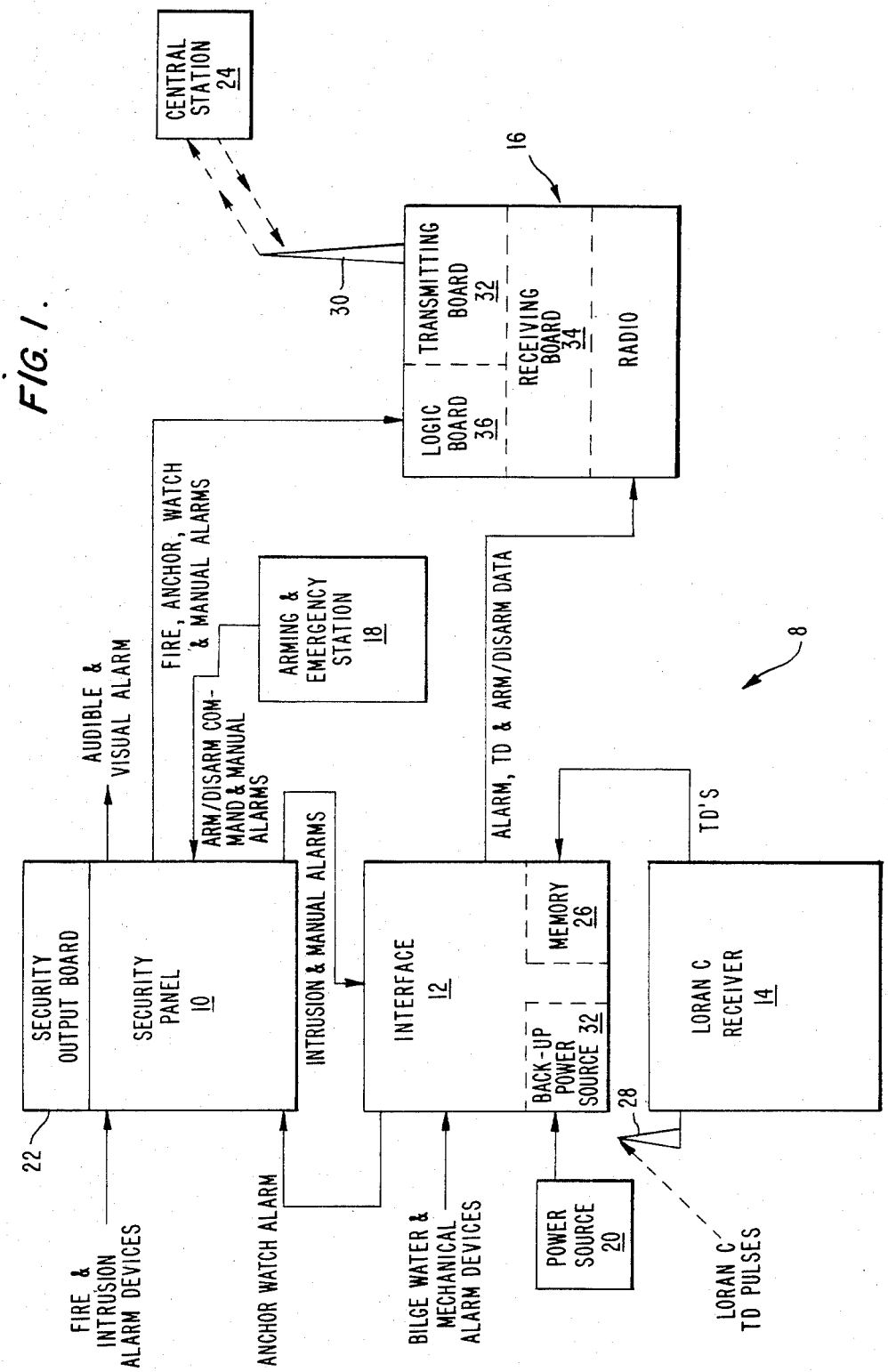
FIG. 1 is a block diagram of the onboard security system.

The security system of the present invention provided on the secured vessel is shown in FIG. 1. As previously mentioned, this invention has equal applicability to be utilized on a land-based vehicle as well as an airplane. However, for purposes of simplicity, we shall describe the operation of the present invention with respect to its use on a marine vessel, it being acknowledged that the various parameters which are monitored would change according to the particular mode of transportation which is to be protected. The onboard security system 8 includes a security panel 10, an interface 12, a LORAN-C receiver 14 as well as a two-way full duplex transmitting radio 16.

The security panel 10 is directly affixed to any convenient console such as would be present in the cockpit of the vessel. This panel is capable of monitoring various conditions such as the presence of a fire and burglary intrusions. Various sensors responsive to these conditions are provided in a multitude of locations throughout the vessel and are hard-wired into the panel itself. Certainly, the exact number of protected zones which are monitored would change to accommodate the particular vessel which is to be protected. However, for purposes of illustration only, the present invention utilizes nine separate input zones which are armed or disarmed through the use of an arming and emergency station 18 directly or indirectly connected to the panel 10. The security panel 10 supplies power for the monitoring devices through the interface 12 which in turn is supplied with power from the vessel's own onboard power supply 20. Although the present invention would automatically transmit a signal to the central station if one of the sensors is activated, the security panel 10 also includes a security output board 22 which automatically triggers the radio 16. Additionally, the security panel 10 provides both audible and visual alarm indications provided by the tripped sensors. As can be appreciated variously sounding alarms are provided for different purposes such that an individual aboard the vessel would be able to quickly differentiate between the fire and burglary alarms or any other condition sensed by the security system. Any intrusion-type alarms could be utilized in the eight burglary zone of the security system, these alarms normally consisting of contact devices mounted on door or hatch openings and/or motion detectors which monitor key areas of the vessel. Additionally, a number of manual switches provided on the arming and emergency station 18 can be utilized to manually input alarms into the security panel 10. These alarms could be utilized for May-Day, medical or man-overboard emergencies. The output board 22 is used to trip either the interface 12 or the radio 16 in order to initiate alarm signal transmissions to a central station 24. The tripping of the interface 12 or the radio 16 by the security output board 22 is accomplished by providing a negative 5 volts potential across the line to either of these two devices. Certainly, the particular potential which is utilized to trip these devices could be altered depending upon the electrical system utilized by the vessel.

The arming and emergency station 18 consists of a plurality of buttons arranged in a manner similar to that of a pushbutton telephone system. This station 18 also is provided with a plurality of light-emitting diodes or similar devices for visually displaying the status of all of the protected zones. The system is armed by punching in the particular identification number of the vessel. A time-delay is provided through one of the entryways allowing an authorized individual to either exit the vessel after arming the security device or disengaging the security device entering the vessel. This delay is accomplished through the use of a mini-computer provided in the security panel 10. If the time-delay is exceeded, a delay signal is sent to the interface 12 and in turn transmitted to the central station.

The arming or disarming of the security system initiates a signal to the interface 12 which allows transmission of the status of the security system to the central station 24. Should one of the intrusion zone sensors be malfunctioning as would be evidenced by the activation or non-activation of its respective LED or similar signaling device provided on the arming and emergency station 18, the authorized user can force arm the device by punching a particular combination on the pushbutton inputs thereby informing the central station that a particular zone is malfunctioning and the central station should disregard any alarm signals generated by the sensor monitoring this zone.

The LORAN-C receiver 14 is provided to receive the signals provided by the master and "slave" transmitters used to produce the raw data required to determine the exact position of the vessel. The receiver 14 receives coded pulses from the master transmission and pulses transmitted from the "slave" transmitters at a predetermined time-delay after the transmission of the signal by the master transmitter. These time delay signals ar directly transmitted to the interface 12 and are retained therein by a microcomputer provided in the interface. These signals are then transmitted from the interface 12 to the radio 16 and are then in turn transmitted to the central station 24. It is of primary importance to note that the time-delays transmitted from the security system to the central station are merely the raw data received by the LORAN-C receiver 14. This data is in turn analyzed by the central station which performs the standard triangulation technique to determine the exact position of the vessel. Additionally, this information is analyzed to determine whether an additional compensating technique should be performed to compensate for various errors which could occur by utilizing the low frequency (between 90 and 110 KHz) ground wave which is transmitted by the LORAN-C transmitters. This particular scheme of performing the triangulation computations at the central station and not on the secured vessel provides for the superior accuracy of this system. Furthermore, the software provided at the central station utilizes all four of the "slave transmitters" and determines which two of those transmitters is transmitting the cleanest signals with respect to quality, signal-to-noise ratio and error code distortion.

The time-delays received by the LORAN-C receiver 14 are also utilized to determine whether the vessel is being used without authorization. This is accomplished by retaining the raw time delay data within the memory 26 of the interface 12. This memory also contains the appropriate software for comparing the raw data received by the LORAN-C receiver 14 to the initial time-delay data received by the onboard security system when the system was initially armed. This comparison determines whether the vessel has moved outside of a predetermined circle of protection. The initial time-delay is used to form the coordinates of a circle having a predetermined radius, such as 1/10th of a mile. The receiver 14 constantly receives the LORAN-C time-delays and transmits this information to the interface 12. The interface 12 then utilizes this information to provide new coordinates. The interface 12 then compare these new coordinates with the coordinates of the vessel determined when the security system was armed. If these new coordinates fall outside of the radius of the original circle, an alarm is sent via the radio 16 to the central station 24 indicating that an unauthorized use of the vessel is taking place. As long as this "anchor watch" portion of the system remains armed, the circle of protection remains in place.

A dual-type antenna is used to receive and transmit information to and from the secured vessel. The radio 16 utilizes a UHF antenna 30 (having a frequency, for example of 460 MHz band). The LORAN-C receiver 14 utilizes a low frequency antenna 28 capable of receiving a frequency of between 90 and 110 KHz. Both of these antennas could be attached to one another and provided in a single case or could be affixed to separate locations on the vessel.

The interface 12 links the security panel 10 and the LORAN-C receiver 14 with the radio 16. This interface is described in a patent application filed contemporaneously with the present application and the subject matter described therein is hereby incorporated by reference. The interface provides power for these three components since it is wired directly to the vessel's battery or power source 20. The interface 12 regulates the voltage and supplies it to each of the other security modules, and includes a back-up power source 32 which is capable of powering the entire system upon the failure of the vessel's own power source. A sensing means is provided within the interface which switches on the back-up power source 32 if the vessel's power source becomes less than a predetermined value, such as 10 volts. Furthermore, the interface will then initiate the radio 16 to transmit the low battery condition to the central station 24.

The interface also acts as a link between the LORAN-C receiver 14 and the radio 16. The raw time-delays are supplied to the interface 12 which stores them in its memory 26, as well as transmitting the raw data to the radio 16 for transmission to the central station 24. As indicated previously, the raw data is then used to determine whether the vessel has moved outside of the circle of protection, thereby indicating that an unauthorized use of the vessel is occurring.

The interface 12 also acts as a conduit between the arming and emergency station, the security panel 10 and the radio 16 for informing the central station 24 that the security system has either been armed, disarmed or forced armed. Furthermore, information relating to the automatic intrusion alarms as well as the manually actuated alarms is sent to the interface 12 by the security panel 10. This information is also relayed to the radio 16 and then to the central station 24. The interface 12 is also capable of independently monitoring the status of various directly wired alarms. These alarms could be used to sense the bilge water level and the status of various mechanical devices upon the vessel, such as the engine or the generator. These alarms are handled on a continuous basis, such as the fire alarm connected to the security panel, and do not have to be armed or disarmed by an operator. Various indicators, such as LEDs or liquid crystals, are directly provided on the arming and emergency station and would positively indicate the status of the bilge water sensor, mechanical breakdown sensor or the anchor watch alarm. Please note, however, that these particular conditions are only exemplary and are not meant to limit the conditions directly sensed by the interface 12.

The two-way radio 16 is capable of sending and receiving digital information by use of an analog method. The radio consists of a transmitting board 32, a receiving board 34 and a security logic board 36. The security logic board 36 is capable of sending signals generated by the fire alarm, the anchor watch alarm and the manual alarms which are directly sent to the radio 16 without being transmitted to the interface 12. Although the anchor watch alarm is monitored by the interface 12, the alarm signal is transmitted to the security panel 10 which in turn transmits it to the radio 16. The radio operates on a full duplex radio frequency so that it is capable of transmitting and receiving on two separate frequencies which allows the central station 24 to simultaneously scan and monitor all of the secured vessels.

The central station 24 is shown in FIG. 2 and primarily consists of a security computer 40, a tracking computer 42 and a tracking monitor 44 as well as printers 46 and 48.

The security computer 40 initiates all of the scanning and polling of the security systems. Data relating to each individual secured system's identification number and the signals transmitted by the radio from the security panel (such as fire, May-Day and anchor watch) are also monitored and controlled by this computer. Additionally, this computer also retains information pertaining to each secured system's use, and emergency information such as the pertinent police, fire department and Coast Guard numbers. The information stored in this computer 40 can periodically be printed on the printer 46 for use by each individual user or the central station.

The tracking computer 42 receives information which is generated by the interface 12 and sent to the radio 16 for transmission to the central station. This data includes information relating to the arming and disarming of the unit, various alarm devices directly controlled by the interface 12 and the time-delays received by the LORAN-C receiver 14. The tracking computer 42 stores the LORAN-C time-delays transmitted by the radio 16 and computes these time-delays into usable latitude and longitude coordinates through the use of internal software. This software is complemented by additional compensation correction techniques implemented by a unit installed at each of a plurality of antenna sites 38. Each of the central stations transmits and receives information through the use of one or more antennas 38 provided with transponders capable of scanning all of the radio transmitters 16 within its line of sight, as well as transmitting encoded data used to perform onboard remote commands. Modems are provided at each antenna site connected by a data link to the central station 24. Alternatively, the antennas could communicate with the central station by a microwave links. Each antenna is also provided with a LORAN-C receiver used to receive the same navigational information received by the LORAN-C receivers provided on each of the secured vessels. The time-delays transmitted to the antennas from each secured vessel along with the time-delays directly received by the antennas from the LORAN-C transmitter are sent to the central station 24. Since the latitude/longitude coordinates of each fixed non-mobile has been determined, inaccuracies created by the various terrain over which the LORAN-C ground waves travel are compensated by comparing the actual latitude/longitude coordinates of the antennas with the coordinates determined by the received LORAN-C pulses. This information is used to correct the location of the second vessel determined by the raw time-delay data transmitted from each vessel to the central station 24. These calculations and compensating techniques are accomplished by the tracking computer 42. The tracking computer 42 also monitors data relating to the parameters controlled by the interface 12 such as arming, disarming, forced arming, bilge water, mechanical breakdown, delayed burglary, instant burglary, various burglary zones and circuit problems with the fire sensor are monitored by this computer.

Similar to the security computer 40, information relating to each user's use of the security system can be provided utilizing the printer 48. The tracking computer 42 has a display means for displaying the user's identification number, any alarm information, as well as a finite number, such as 10, of the vessel's previous latitude and longitude coordinates. Furthermore, the tracking computer could display the heading, speed and distance traveled by the vessel between each of the signal receptions.

The tracking monitor 44 is utilized to directly display the position of the vessel on a detailed map of the particular monitoring area. This is particularly useful in areas where many inlets and canals are prevalent. When a May-Day or similar alarm is received by the central station 24, the exact location of the vessel is displayed upon the tracking monitor 44 which is very helpful in relaying the exact position of the vessel to the proper authorities such as the Coast Guard.

The operation of this device will now be described in more detail. The central station periodically polls each of the secured units dependent upon the particular situation for each unit. For example, this polling can take place as often as every 90 seconds when the vessel is in transit, or as infrequently as every 128 hours when the vessel is in port. The polling is accomplished by transmitting an analog signal from the central station 24 which is received by the radio antenna 30. This signal includes the user's identification number and is directly sent from the radio 16 to the interface 12. Regardless of whether an alarm signal has or has not been generated or sensed by the security panel 10 or the interface 12, the interface would direct the radio 16 to transmit an analog signal of the user's identification followed by a digital signal containing the raw time-delay data back to the central station 24. This feature allows the user's identification number to be verified as well as simultaneously updating the position of the vessel. This information is received by the antenna 38 and is sent to the security computer 40 as well as the tracking computer 42. The security computer 40 is designed to input only the user's identification number and the tracking computer 42 is designed to accept only the raw time-delays and various alarm signals. However, if the security panel generates a signal such as a fire, anchor watch or manual alarm activation which is directly sent to the radio without directly utilizing the interface 12, this information is encoded as the third byte of data in the three byte identification number data stream. The central station transmits the customer ID number and the radio 16 responds by transmitting the user's identification number followed by a analog signal indicating the occurrence of an alarm condition and then providing the digital time-delay data. On the other hand, if an alarm condition is generated which utilizes the interface 12, this information is transmitted by the radio 16 to the central station 24 by a digital signal which follows the raw time-delay data. These two bytes of data are always transmitted whether they are zero or not.

If, however an alarm condition is sensed by the security panel 10 or the interface 12 during a non-scanning interval by the central station 24, this alarm condition is sent to the radio 16 which transmits the user's identification number to the central station. The central station would then transmit the user's identification number to the secured vessel 8 which would then retransmit the identification number followed by either the alarm signal generated by the security panel 10 or the alarm signal generated by the interface 12, or both.

The information received by the central station 24 is then processed by the security computer 40 and the tracking computer 42. The time-delays and the alarm signals generated by the interface 12 and passed to the tracking computer 42. If there is an error in this transmission, the security computer 40 repolls the vessel. If this new data is determined to be valid the tracking computer 42 gives a handshake to the security computer 40 and the identification number and the alarm byte is then passed to the tracking computer 42. The tracking computer is thus used to dispatch all alarms. The type of alarm signal received by the central station would dictate the action taken by the central station. This action would include informing the proper authorities or remotely performing various functions.

With respect to the anchor watch, once the interface 12 determines that the vessel has traveled beyond its circle of security, a visual indicator arming station 18 would be activated and an audible signal generated. These signals are maintained for a predetermined period of time, such as 60 seconds, which would allow an authorized user to disarm the system before the transmission of the anchor alarm to the central station. However, should the 60 second delay period expire without the user disarming this system, the anchor alarm is then transmitted to the security panel which then enables the radio 16 to transmit a signal to the central station indicating that the central station should poll this particular user.

The description of the preferred embodiments of the security system contained herein is merely illustrative of the principals underlying the inventive concept of such a system. Without departing from the spirit and scope of the invention, various modifications of the disclosed embodiments as well as other embodiments of the invention will be apparent to persons skilled in the art. For example, it is not imperative that a land-based LORAN-C navigational system be employed. Instead of such a land-based system, a satellite tracking system utilizing at least two geo-synchronous satellites could be used. Additionally, a separate LORAN-C receiver need not be employed and this unit could be miniaturized and be directly affixed or provided in the interface.

Furthermore, although the central station is shown to utilize a separate security computer, a separate tracking computer and a separate monitor, all three of these devices could be incorporated into a single computer. Also, information transmitted from the radio to the various computer components of the central station could be in both analog and digital form and these differences in signal composition would be used to determine which information is to be processed by the security computer and which information is to be processed by the tracking computer.

What is claimed is:

1. A method of determining the latitude/longitude coordinate of a mode of transportation, including the steps of:
   providing a receiver on said mode of transportation for receiving pulses generated by a navigational tracking system having at least two transmitting stations;
   receving the pulses generated by the navigational tracking system on said mode of transportation;
   transmitting time-delay data based upon said pulses to a central station in communication with a fixed antenna from said mode of transportation; and
   calculating the latitude/longitude coordinate of said mode of transportation at said central station based upon the time delay data received by said central station.

2. The method of determining the exact latitude/longitude coordinates of a mode of transportation in accordance with claim 1 further including the steps of:
   determining the latitude/longitude coordinate of said fixed antenna utilized to receive the time delay data generated by said mode of transportation and received by said central station;
   providing a receiver on said antenna for directly receiving the pulses generated by the navigational tracking system;
   computing the latitude/longitude coordinates of said antenna utilizing the pulses directly received from the navigational tracking system;
   comparing the latitude/longitude coordinates of said antenna compiled in said determining step with the latitude/longitude coordinates of said antenna compiled utilizing the pulses directly transmitted by said navigational tracking system to said antenna;
   developing compensated data based upon the information generated by said comparing step; and
   recomputing the latitude/longitude coordinates of said mode of transporation based upon the generated compensated data.

3. A security monitoring system for protecting a mode of transporation comprising:
   a security means provided on said mode of transportation for monitoring a plurality of conditions on said mode of transporation, said security means provided with a memory unit;
   a receiver means connected to said security means for receiving pulses generated by a navigational tracking system provided with at least two transmitters, said memory unit storing time delay data based upon said received pulses;
   a receiving and transmitting radio connected to said security means and said receiver means;
   a central station provided at a position remote from said mode of transportation for monitoring the information generated by said security means and determining the latitude/longitude coordinates of said mode of transportation based upon the time delay data received by said receiver means and transmitted to said central station by said radio.

4. The security monitoring system in accordance with claim 3 wherein said security means includes a security panel for monitoring a first set of parameters and secured zones, and an interface for monitoring a second set of parameters, said security panel generating a series of first signals based upon the condition of said first set of parameters and secured zones and said interface generating a series of second signals based upon the condition of said second set of parameters, both said first and second signals sent to said receiving and transmitting radio for transmission to said central station.

5. The security monitoring system in accordance with claim 4 wherein said security panel further includes an input panel for initiating the operation of said security monitoring system.

6. The security monitoring system in accordance with claim 5 wherein said input panel further includes a means for determining the status of said secured zones and bypassing the arming of one of said zones if said zone is monitoring a faulty sensor.

7. The security monitoring system in accordance with claim 3 further including a fixed antenna in communication with said central station for receiving first signals transmitted by said radio and directly receiving the navigational pulses generated by the navigational tracking system, said antenna sending said first signals and said directly received pulses to said central station, and transmitting second signals generated by said central station to said radio.

8. The security monitoring system in accordance with claim 7 wherein said central station includes a computer utilizing the pulses directly received by said fixed antenna to determine the accuracy of the navigational pulses received by said receiving and transmitting means provided on said mode of transportation, said computer providing compensating latitude/longitude coordinates of said mode of transportation based upon the information provided in said first signals transmitted by said radio and the navigational pulses directly received by said fixed antenna.

9. The security monitoring system in accordance with claim 8 wherein said computer includes a monitor for displaying the latitude/longitude coordinates of said mode of transportation.

10. The security monitoring system in accordance with claim 9 wherein said computer includes a means for monitoring said security means provided in said mode of transportation, said monitoring means responsive to a first series of first signals generated by said security means and said computer responsive to a series of second signals generated by said security means.

11. The security monitoring system in accordance with claim 3 wherein said security means includes a memory means and a means for performing computations, said security means utilizing the pulses received by said receiving means generated by the navigational tracking system to determine a first latitude/longitude coordinates of said mode of transportation, storing said first latitude/longitude coordinates in said memory, continually utilizing the incoming pulses received by said receiving means to determine subsequent latitude/longitude coordinates of said mode of transportation and comparing said subsequent latitude/longitude coordinates of said mode of transportation with said first latitude/longitude coordinates; wherein said security means determines whether said mode of transportation has been moved at least a predetermined distance.

12. The security monitoring system in accordance with claim 11 wherein said security means generates a signal transmitted to said central station if said mode of transportation has been moved at least a predetermined distance.

13. The security monitoring system in accordance with claim 4, wherein said first series of signals is analog and said second series of signals is digital.

14. The security monitoring system in accordance with claim 10 wherein said first series of signals is analog and said second series of signals is digital.

15. The method of determining the latitude/longitude coordinates of a mode of transportation in accordance with claim 1 further including the steps of:
monitoring a plurality of conditions on said mode of transportation; and
transmitting security signals from said mode of transportation to said central station, said security signals generated by said monitoring step.

16. A system for deetermining the latitude/longitude coordinates of a mode of transportation based upon signals initially generated by a navigational tracking system having at least two transmitting stations comprising:
a central station in communication with an antenna having known latitude/longitude coordinates, said antenna receiving pulses generated by the navigational tracking system;
a receiver on said mode of transportation for receiving pulses generated by the navigational tracking system;
a memory device in direct communication with said receiver for storing the pulses received by said mode of transportation and generated by the navigational tracking system;
a transmitter in direct communication with said memory device for transmitting time-delay data stored in said memory device to said antenna of said central station; and
first means provided at said central station for calculating the latitude/longitude coordinates of the mode of transportation based upon the time delay data received by said central station.

17. The system for determining the latitude/longitude coordinates of a mode of transportation in accordance with claim 16 further including:
second means provided at said central station for calculating the latitude/longitude coordinates of said antenna utilizing the pulses directly received from the navigational tracking system;
comparing and compensating means provided at said central station in communication with said second means for comparing the known latitude/longitude coordinates of said antenna with the latitude/longitude coordinates calculated by said second means, and developing compensated data based upon the known latitude/longitude coordinates of said antenna compared to the latitude/longitude coordinates calculated by said second means; and
third means provided at said central station and in communication with said first means and said comparing and compensating means for recomputing the latitude/longitude coordinates of said mode of transportation based upon the compensated data developed by said comparing and compensating means.

18. A security monitoring system for protecting a mode of transportation comprising:
   a security means provided on said mode of transportation for monitoring a plurality of conditions on said mode of transportation;
   a receiver means connected to said security means for receiving pulses generated by a navigational tracking system provided with at least two transmitters;
   a receiving and transmitting radio connected to said security means and said receiver means;
   a central station provided at a position remote from said mode of transportation for monitoring the information generated by said security means and determining the latitude/longitude coordinates of said mode of transportation based upon the information received by said receiver means and transmitted to said central station by said radio; and
   a fixed antenna in communication with said central station for receiving first signals transmitted by said radio and directly receiving the navigational pulses generated by the navigational tracking system, said antenna sending said first signals and said directly received pulses to said central station, and transmitting second signals generated by said central station to said radio.

19. The security monitoring system in accordance with claim 18 wherein said security means includes a security panel for monitoring a first set of parameters and secured zones, and an interface for monitoring a second set of parameters, said security panel generating a series of first signals based upon the condition of said first set of parameters and secured zones and said interface generating a series of second signals based upon the condition of said second set of parameters, both said first and second signals sent to said receiving and transmitting radio for transmission to said central station.

20. The security monitoring system in accordance with claim 19 wherein said security panel further includes an input panel for initiating the operation of said security monitoring system.

21. The security monitoring system in accordance with claim 20 wherein said input panel furtheer includes a means for determining the status of said secured zones and bypassing the arming of one of said zones if said zone is monitoring a faulty sensor.

22. The security monitoring system in accordance with claim 18 wherein said central station includes a computer utilizing the pulses directly received by said fixed antenna to determine the accuracy of the navigational pulses received by said receiving and transmitting means provided on said mode of transportation, said computer providing compensating latitude/longitude coordinates of said mode of transportation based upon the information provided in said first signals transmitted by said radio and the navigational pulses directly received by said fixed antenna.

23. The security monitoring system in accordance with claim 22 wherein said computer includes a monitor for displaying the latitude/longitude coordinates of said mode of transportation.

24. The security monitoring system in accordance with claim 23 wherein said computer includes a means for monitoring said security means provided in said mode of transportation, said monitoring means responsive to a first series of first signals generated by said security means and said computer responsive to a series of second signals generated by said security means.

25. The security monitoring system in accordance with claim 18 wherein said security means includes a memory means and a means for performing computations, said security means utilizing the pulses received by said receiving means generated by the navigational tracking system to determine a first latitude/longitude coordinates of said mode of transportation, storing said first latitude/longitude coordinates in said memory, continually utilizing the incoming pulses received by said receiving means to determine subsequent latitude/longitude coordinates of said mode of transportation and comparing said subsequent latitude/longitude coordinates of said mode of transportation with said first latitude/longitude coordinates; wherein said security means determines whether said mode of transportation has been moved at least a predetermined distance.

26. The security monitoring system in accordance with claim 25 wherein said security means generates a signal transmitted to said central station if said mode of transportation has been moved at least a predetermined distance.

27. The security monitoring system in accordance with claim 19, wherein said first series of signals is analog and said second series of signals is digital.

28. The security monitoring system in accordance with claim 24 wherein said first series of signals is analog and said second series of signals is digital.

29. A security monitoring system for protecting a mode of transportation comprising:
   a security means provided on said mode of transportation for monitoring a plurality of conditions on said mode of transportation;
   a receiver means connected to said security means for receiving pulses generated by a navigational tracking system provided with at least two transmitters;
   a receiving and transmitting radio connected to said security means and said receiver means;
   a central station provided at a position remote from said mode of transportation for monitoring the information generated by said security means and determining the latitude/longitude coordinates of said mode of transportation based upon the information received by said receiver means and transmitted to said central station by said radio;
   a fixed antenna in communication with said central station for receiving first signals transmitted by said radio and directly receiving the navigational pulses generated by the navigational tracking system, said antenna sending said first signals and said directly received pulses to said central station, and transmitting second signals generated by said central station to said radio;
   a computer provided in said central station which utilizes the pulse directly received by said fixed antenna to determine the accuracy of the navigational pulses received by said receiving and transmitting means provided on said mode of transportation, said computer providing compensating latitude/longitude coordinates of said mode of transportation based upon the information provided in said first signals transmitted by said radio and the navigational pulses directly received by said fixed antenna; and
   display monitor in communication with said computer for displaying the latitude/longitude coordinates of said mode of transportation on a geographical map.

* * * * *